United States Patent [19]
Liu

[11] Patent Number: 5,995,683
[45] Date of Patent: Nov. 30, 1999

[54] IMAGE SCANNER HAVING SCAN-MONITORING FUNCTION

[75] Inventor: Julian Liu, Hualien, Taiwan

[73] Assignee: Mustek Systems, Inc., Hsinchu, Taiwan

[21] Appl. No.: 08/903,538

[22] Filed: Jul. 30, 1997

[30] Foreign Application Priority Data

Apr. 10, 1997 [TW] Taiwan ................................. 86205584

[51] Int. Cl.⁶ ...................................................... G06K 7/00
[52] U.S. Cl. ......................... 382/312; 382/313; 358/473; 358/474
[58] Field of Search .................................... 382/312–315, 382/316–324; 358/473–475, 468; 399/177, 81, 32, 203; 250/208.1, 551–552, 554, 559.06; 235/562.35, 462.45

[56] References Cited

U.S. PATENT DOCUMENTS

| | | | |
|---|---|---|---|
| 4,298,270 | 11/1981 | Tsuda et al. | 399/203 |
| 4,625,086 | 11/1986 | Karino | 219/720 |
| 4,853,739 | 8/1989 | Miyamoto et al. | 399/32 |
| 5,365,605 | 11/1994 | Hosogoe et al. | 382/313 |
| 5,719,970 | 2/1998 | Aoki et al. | 382/313 |
| 5,814,809 | 9/1998 | Han | 250/208.1 |

*Primary Examiner*—Leo H. Boudreau
*Assistant Examiner*—Ishrat Sherali
*Attorney, Agent, or Firm*—Merchant & Gould P.C.

[57] ABSTRACT

The present invention is related to an image scanner including a housing; an optical device installed in the housing for performing photoelectric conversion of an image of a scanned object in response to a scanning light signal; a scan-monitoring device arranged on a surface of the housing for indicating a scanning state of the image scanner in response to an indicating light signal; and a light source installed in the housing for emitting light when the image scanner is powered, with a first portion of the light provided to the optical device as the scanning light signal and a second portion of the light provided to the scan-monitoring device as the indicating light signal. The scan-monitoring device can be easily provided, and owing to the omission of the LED compared to the conventional image scanner, the present invention is more cost-effective.

18 Claims, 4 Drawing Sheets

IMAGE SCANNER HAVING SCAN-MONITORING FUNCTION

FIELD OF THE INVENTION

The present invention is related to an image scanner, and more particularly to an image scanner having a scan-monitoring device for indicating the scanning stages of the image scanner.

BACKGROUND OF THE INVENTION

Conventionally, an LED (light-emitting diode) device mounted on the housing of an image scanner is used to indicate the scanning stage of the image scanner. For example, the LED device emit no light to mean that the image scanner is in an off-line state, and on the contrary, the LED device emits light to indicate that the image scanner is in an on-line. If the light emitted by the LED device is continuous, it indicates that the image scanner is in a standby state, and if the LED device emits twinkling light, it indicates that the image scanner is in an image-reading state. In addition, the LED device may emit light of another color to warn that the image-scanning operation cannot be performed or go on.

SUMMARY OF THE INVENTION

An object of the present invention is to provide an image scanner performing the scan-monitoring function without using any LED device so that the cost for the LED device can be eliminated.

Another object of the present invention is to provide an image scanner having a scan-monitoring device which is arranged on the housing of the image scanner more easily than the LED device is.

A further object of the present invention is to provide an image scanner having a scan-monitoring device which allows the stages of the scanning process can be easily observed.

According to the present invention, an image scanner includes a housing; an optical device installed in the housing for performing photoelectric conversion of an image of a scanned object in response to a scanning light signal; scan-monitoring means arranged on a surface of the housing for indicating a scanning state of the image scanner in response to an indicating light signal; and a light source installed in the housing for emitting light when the image scanner is powered, with a first portion of the light provided to the optical device as the scanning light signal and a second portion of the light provided to the scan-monitoring means as the indicating light signal.

In accordance with another aspect of the present invention, the optical device is a charge coupled device (CCD).

In accordance with another aspect of the present invention, the light source is a tubular light.

In accordance with another aspect of the present invention, the surface which the scan-monitoring means is arranged on can be the upper surface of the housing. Alternatively, the surface which the scan-monitoring means is arranged on can be either side surface of the housing.

Preferably, the scan-monitoring means is a light-transmittable member which allows the indicating light signal to penetrate therethrough to be observed, thereby indicating the scanning state of the image scanner.

In a preferred embodiment, the light-transmittable member includes an elongated opening arranged along the scanning path.

In a more preferred embodiment, the light-transmittable member further includes a transparent plate such as a glass plate or an acrylic plate fitted in the elongated opening.

Furthermore, there can be literal expressions on the transparent plate to indicate the scanning state.

In another preferred embodiment, the light-transmittable member includes a plurality of holes arranged in alignment along the scanning path. More preferably, the light-transmittable member further includes a plurality of transparent plates such as glass plates or acrylic plates fitted in the plurality of holes, respectively.

Moreover, there can be literal expressions on the transparent plates to indicate the scanning state.

In accordance with the present invention, the image scanner can be a flatbed scanner. In a particularly preferred embodiment, the housing of the flatbed scanner includes a cover housing and a container housing, and the scan-monitoring means is arranged on the upper surface of the cover housing. As for the scan-monitoring means, it preferably includes an elongated opening arranged along the scanning path and a transparent plate fitted in the elongated opening for allowing the indicating light signal to penetrate therethrough to be observed, thereby indicating the scanning state of the image scanner.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
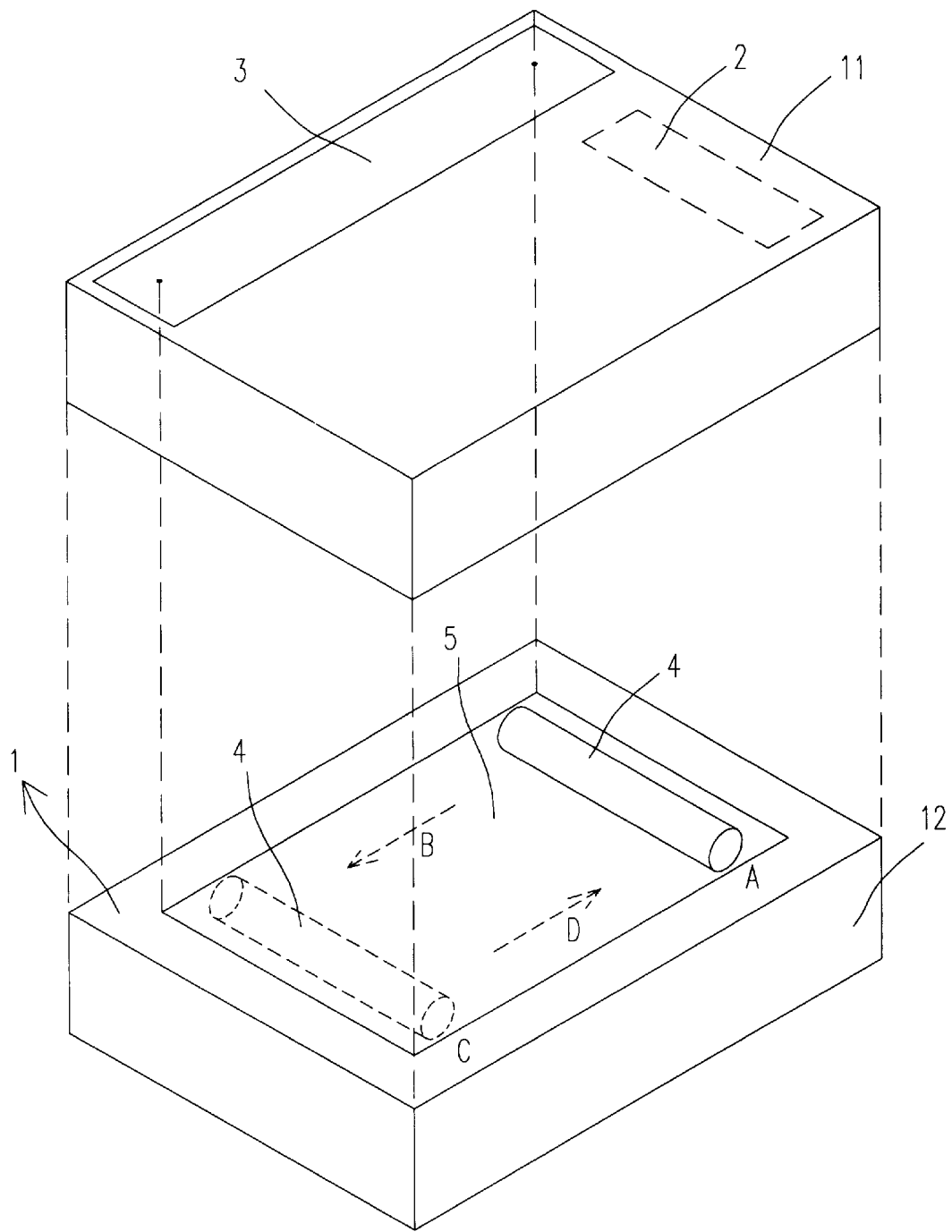
FIG. 1 is a schematic diagram showing a first preferred embodiment of an image scanner according to the present invention.

Please now refer to FIG. 1 which is a schematic diagram showing a first preferred embodiment of an image scanner according to the present invention. The image scanner shown in FIG. 1 is a flatbed scanner which includes a housing 1, an optical device 2, scan-monitoring means 3, a light source 4, and a working platform 5. The housing 1 includes an upper portion 11, i.e. a cover housing, and a lower portion 12, i.e. a container housing. In general, the optical device 2 is a CCD device installed in the housing 1 for performing photoelectric conversion of an image of a scanned object (not shown) placed on the working platform 5 which is generally a piece of transparent glass, and pressed smoothly between the upper portion 11 and the lower portion 12. While the CCD device 2 shown in FIG. 1 is located in the upper portion 11 of the housing 1 to perform a transmission-mode scanning, the CCD device 2 can also be installed in the lower portion 12 of the housing to perform a reflection-mode scanning. The working principle of a CCD device in an image scanner is well known to those skilled in the art and will not be redundantly described here. In either scanning mode, the CCD device receives a light signal from the light source 4, the light penetrating the scanned object or the light reflected by the scanned object, so as to perform the image reading operation. The scan-monitoring means 3 in this preferred embodiment is arranged on an upper surface of the upper portion 11. According to the present invention, the scan-monitoring means 3 indicates the scanning state or scanning stage of the image scanner in response to a light signal generated by the light source 4. Concretely, in the preferred embodiment shown in FIG. 1, the scan-monitoring means 3 is a light-transmittable member, e.g. an elongated opening arranged along the scanning path or preferably, an elongated opening with a transparent plate such as a glass plate or an acrylic plate fitted therein. In brief, the light source 4 installed in the lower housing 12 emits light when the image scanner is powered, that is, the image scanner is in an off-line state if no light emission is observed, and when the light source 4 emits light, part of the light reaches the CCD device 2 as a scanning light signal (L1 in FIG. 2) to perform the photoelectric conversion and part of the light penetrates the light-transmittable member 3 as an indicating light signal (T1 in FIG. 2) to be observed by the user. In this preferred embodiment, it should be noted that if the image scanner performs a reflection-made scanning, the scanned object had better be narrower than the working platform 5 in order not to obstruct the access of the light emitted by the light source 4 to the scan-monitoring means 3 through the transparent working platform 5.

Figure 2:
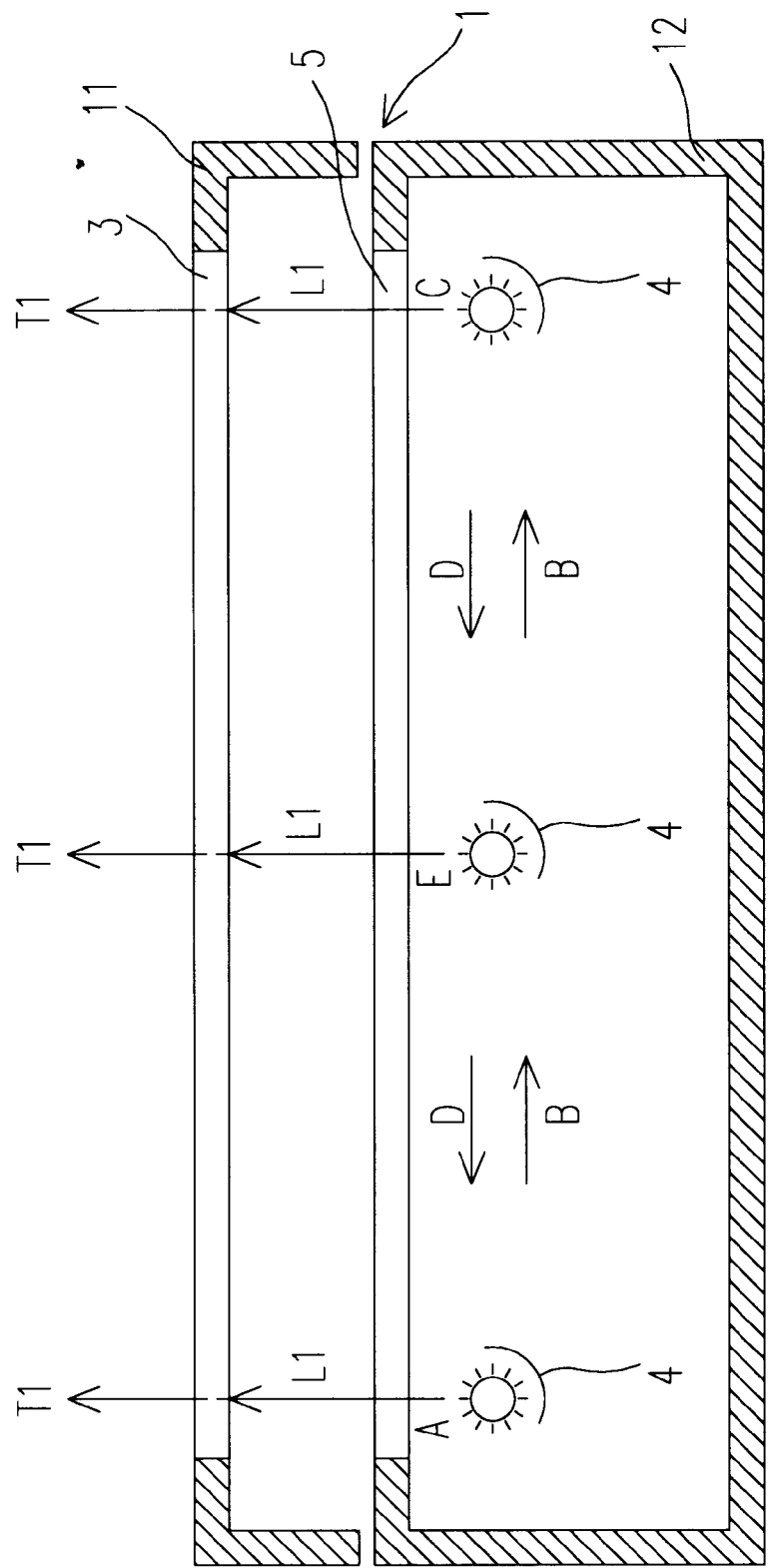
FIG. 2 is an elevational side view of the image scanner of FIG. 1, showing how the various scanning states of image scanner are indicated by scan-monitoring means.

Further in view of FIG. 2 which is an elevational side view of the image scanner of FIG. 1, showing how the various scanning states of image scanner are indicated by scan-monitoring means, the working principle of the scan-monitoring means will be illustrated. As described above, when there in no light emitted by the light source 4 is observed via the light-transmittable member 3, it means that the image scanner is in an off-line state. In other words, when the image scanner is in an on-line state, the user can see light through the light-transmittable member 3. When the user observes that the light source 4 constantly emits light through the light-transmittable member 3 at the starting position A, it indicates that the image scanner is in a standby state. When a scanning operation is performed, the light source 4 moves along the scanning path, as indicated by the arrow B, to pick up the image of the scanned object line by line. Meanwhile, the user can see the light line moves in response to the movement of the light source 4 via the light-transmittable member 3. Upon the light line reaching the end position C, it indicates that the image-reading operation is finished. Afterwards, the light source 4 moves in a direction indicated by the arrow D back to the starting point A, and the user also can observe the homeward journey of the light source 4 through the light-transmittable member 3. If the image scanner is down during the scanning process, the user can also observe it through the light-transmittable member 3 because the light source 4 and of course the light line will stay at the same position, for example the position E in FIG. 2, and remain unmoving. By this way, the user can monitor the entire scanning process of the image scanner in an easy and convenient manner.

Figure 3:
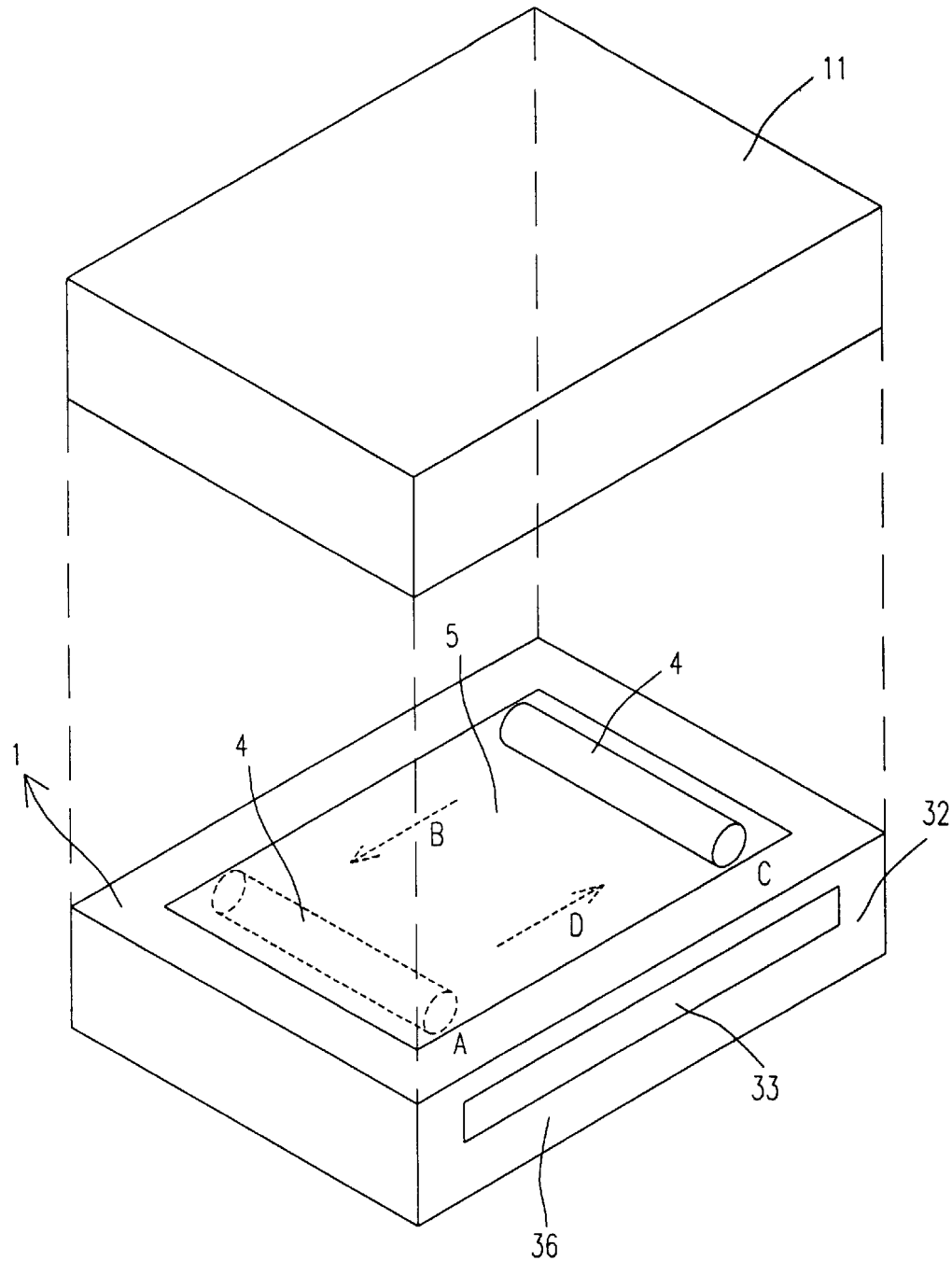
FIG. 3 is a schematic diagram showing a second preferred embodiment of an image scanner according to the present invention.

In a second preferred embodiment as shown in FIG. 3, the scan-monitoring means is a light-transmittable member 33 arranged on either of the side surfaces 36 of the lower housing 32, which is an elongated opening arranged along the scanning path and preferably an elongated opening having a transparent plate fitted therein. The working principle of this preferred embodiment is similar to that of the first preferred embodiment as shown in FIG. 1 except that the transmission direction of the indicating light signal T1 is changed.

Figure 4:
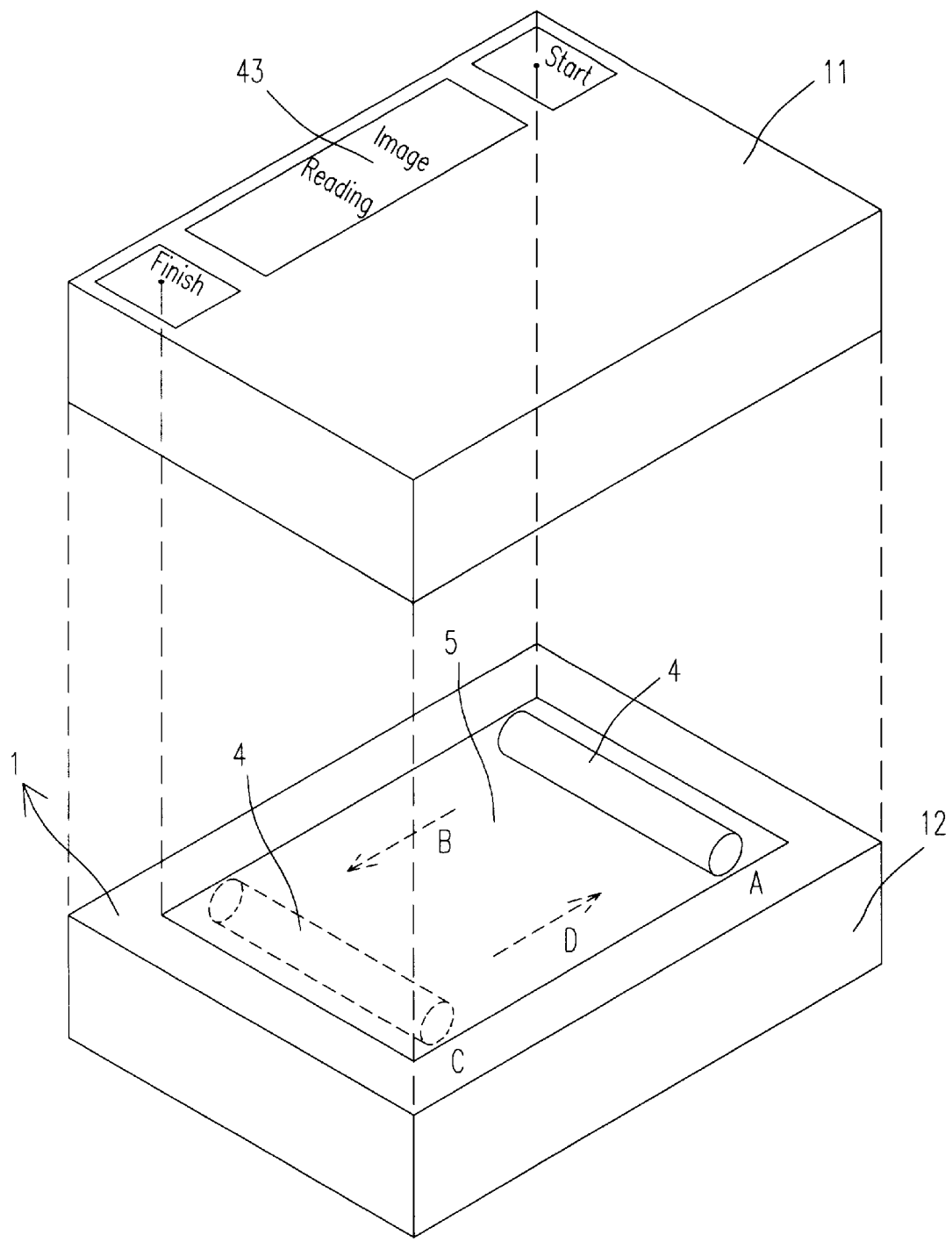
FIG. 4 is a schematic diagram showing a third preferred embodiment of an image scanner according to the present invention.

Referring now to FIG. 4 which is a schematic diagram showing a third preferred embodiment of an image scanner according to the present invention, the configuration of the image scanner represented by the third preferred embodiment is similar to that in the first preferred embodiment except that the scan-monitoring device 43 is consisted of three openings, each of which has a transparent plate fitted therein. It is apparent that a plurality of holes arranged in series rather than three elongated opening can also be used as the scan-monitoring device 43 for beautifying the appearance of the image scanner. Furthermore, there are literal expressions, such as start, image reading and finish, on the transparent plates to indicate the scanning state. Of course, the first preferred embodiment of the image scanner can also have literal expressions thereon.

To sum up, the present invention provides an image scanner having means for scan monitoring in order to indicate the scanning stages of the image scanner. The scan-monitoring means can be easily provided, for example, an elongated opening is previous reserved to serve as the scan-monitoring means while manufacturing the scanner housing. Owing to the omission of the LED compared to the conventional image scanner, the present invention is more cost-effective.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner, comprising:

a housing;

an optical device installed in said housing for performing photoelectric conversion of an image of a scanned object in response to a scanning light signal;

a scan-monitoring means arranged on a surface of said housing for indicating a scanning state of said image scanner in response to an indicating light signal; and a tubular scanning light source installed in said housing for emitting light when said image scanner is powered, with a first portion of said light emitted from said tubular scanning light source being provided to said optical device as said scanning light signal and simultaneously a second portion of said light emitted from said tubular scanning light source being provided to said scan-monitoring means as said indicating light signal wherein said scan-monitoring means is a light-transmittable member arranged along the scanning path which can allow said indicating light signal to penetrate through to be observed, and wherein said scanning state of said image scanner is indicated by said indicating light signal being a light spot moving inside said light-transmittable member.

2. The image scanner according to claim 1 wherein said optical device is a charge coupled device (CCD).

3. The image scanner according to claim 1 wherein said surface which said scan-monitoring means is arranged on is the upper surface of said housing.

4. The image scanner according to claim 1 wherein said surface which said scan-monitoring means is arranged on is either side surface of said housing.

5. The image scanner according to claim 1 wherein said light-transmittable member includes an elongated opening arranged along the scanning path.

6. The image scanner according to claim 5 wherein said light-transmittable member further includes a transparent plate fitted in said elongated opening.

7. The image scanner according to claim 6 wherein said transparent plate is a glass plate.

8. The image scanner according to claim 6 wherein said transparent plate is an acrylic plate.

9. The image scanner according to claim 6 wherein there are literal expressions on said transparent plate to indicate said scanning state.

10. The image scanner according to claim 1 wherein said light-transmittable member includes a plurality of holes arranged in alignment along the scanning path.

11. The image scanner according to claim 10 wherein said light-transmittable member further includes a plurality of transparent plates fitted in said plurality of holes, respectively.

12. The image scanner according to claim 11 wherein each of said transparent plate is a glass plate.

13. The image scanner according to claim 11 wherein each of said transparent plate is an acrylic plate.

14. The image scanner according to claim 11 wherein there are literal expressions on said transparent plates to indicate said scanning state.

15. The image scanner according to claim 1 wherein said image scanner is a flatbed scanner.

16. The image scanner according to claim 15 wherein said housing includes a cover housing and a container housing.

17. The image scanner according to claim 16 wherein said scan-monitoring means is arranged on the upper surface of said cover housing.

18. The image scanner according to claim 17 wherein said scan-monitoring means includes an elongated opening arranged along the scanning path and a transparent plate fitted in said elongated opening for allowing said indicating light signal to penetrate therethrough to be observed, thereby indicating said scanning state of said image scanner.

* * * * *